United States Patent [19]

Tamura et al.

[11] Patent Number: 4,528,655

[45] Date of Patent: Jul. 9, 1985

[54] APPARATUS FOR DETECTING VARIATION OF ELECTROSTATIC CAPACITANCE

[75] Inventors: Sadahiro Tamura, Kyoto; Toshio Nishikawa, Nagaokakyo, both of Japan

[73] Assignee: Murata Manufacturing Co., Ltd., Japan

[21] Appl. No.: 440,293

[22] Filed: Nov. 9, 1982

[30] Foreign Application Priority Data

Nov. 16, 1981 [JP] Japan ............................ 56-185124
Dec. 8, 1981 [JP] Japan ........................ 56-183028[U]

[51] Int. Cl.³ ........................................ G11B 9/06
[52] U.S. Cl. .............................. 369/126; 369/129; 324/60 R
[58] Field of Search ............. 369/126, 129, 135, 151, 369/145, 170; 324/60 R

[56] References Cited

U.S. PATENT DOCUMENTS 3,624,315 11/1971 Broce .................. 369/145
3,872,240 3/1975 Carlson ................ 369/129
3,952,145 4/1976 Allen .................. 369/126
4,080,625 3/1978 Kawamoto ............... 369/129

Primary Examiner—Alan Faber
Attorney, Agent, or Firm—Ostrolenk, Faber, Gerb & Soffen

[57] ABSTRACT

An apparatus for detecting a variation of an electrostatic capacitance is advantageously utilized for reproducing information from a groove or pit formed on a disc of a CED type or a VHD type, for example, and comprises an oscillator and a resonance circuit each including a dielectric resonator, wherein the oscillator and the resonance circuit are capacitively coupled, while the resonance frequency of the resonance circuit is changed in accordance with a change of the electrostatic capacitance to be detected, whereby a signal output dependent on a variation of the electrostatic capacitance is obtained from a detector directly coupled to the resonance circuit.

7 Claims, 8 Drawing Figures

APPARATUS FOR DETECTING VARIATION OF ELECTROSTATIC CAPACITANCE

BACKGROUND OF THE INVENTION

1. Field of the Invention

The present invention relates to an apparatus for detecting a variation of electrostatic capacitance. More specifically, the present invention relates to an improvement in an apparatus for detecting a minor variation of electrostatic capacitance occurring between a stylus and a disc in a video disc apparatus of the CED type or the VHD type, or in a measuring apparatus of any various types, for example.

2. Description of the Prior Art

A video disc apparatus for reproducing sound and video signals recorded on a disc has been proposed. Such video disc apparatus has been implemented as a CED (Capacitance Electronic Disc) type or a VHD (Video High density Disc) type. In such a video disc apparatus, reproduction is made of information upon detection of a variation of electrostatic capacitance between a stylus and a disc on which information is recorded. However, a variation of the capacitance between a stylus and a disc is as small as $C \approx 10^{-4}$ pF and therefore an FM video signal recorded on the disc can hardly by directly read from the variation of the electrostatic capacitance. Therefore, a resonance circuit having a resonance frequency sufficiently higher than the maximum frequency of the FM video signal is provided so that a capacitance variation from the stylus is transferred to the resonance circuit to change the resonance frequency thereof. An oscillation signal produced by an oscillation circuit having an oscillation frequency sufficiently larger than the maximum frequency of the FM video signal is applied to the above described resonance circuit so that amplitude modulation is made by passing the oscillation signal through the resonance circuit, the resonance frequency of which varies in accordance with the variation of the capacitance between the stylus and the disc. The FM video signal can be read using an envelope detector which detects the envelope of the amplitude modulated signal.

FIG. 1 is a schematic diagram of a conventional FM video signal reproducing circuit which is employed in a video disc apparatus of either the CED type or the VHD type in which the present invention can be employed. Referring to FIG. 1, a terminal 1 coupled to a pick-up, i.e. a stylus, (not shown) is connected through a coil 2 and a capacitor 3 to ground. Accordingly, the coil 2 and the capacitor 3 together with the electrostatic capacitance between the stylus and the disc constitute an LC parallel resonance circuit. The parallel resonance circuit has a resonance frequency of, for example, 910 MHz. In practice, a stripline is formed on a board, not shown, of fluoride resin such as Teflon (trademark) and the fluoride resin board is covered with a metallic casing. More specifically, a coaxial resonator is formed with the above described stripline, the fluoride resin board and the metallic casing. A metalic electrode is provided at the tip end of the stylus, while the disc is made of a conductive material and is connected to the ground. Therefore, an electrostatic capacitance value between the stylus and the disc changes as a function of grooves or pits formed on the disc. Accordingly, this structure is equivalent to a parallel connection of a capacitor of a capacitance value which changes in accordance with the groove or the pit to the above described coaxial resonator, wherein the resonance frequency of the resonator fluctuates with respect to the central frequency of 910 MHz.

Furthermore, an oscillator 4 oscillating at the frequency of, for example, 915 MHz, a detector 5, and an amplifier 6 for amplifying the output from the detector 5 are provided on the above described fluoride resin board. The oscillator 4 and the coaxial resonator are electromagnetically coupled or antenna coupled and similarly the coaxial resonator and the detector 5 are also electromagnetically coupled. More specifically, coupling striplines 7 and 8 are provided on the board in the vicinity of the stripline constituting a portion of the resonator. The oscillation output from the oscillator 4 is supplied to the stripline 7 and the stripline 8 is connected to the detector 5. Accordingly, the signal of the frequency of 915 MHz transmitted from one stripline 7 is amplitude modulated by the resonator in accordance with the variation of the capacitance between the stylus and the disc and is received by the other stripline 8. The amplitude modulated signal received by the stripline 8 is envelope detected by the detector 5 and is converted into an FM video signal. The FM video signal is amplified by the amplifier 6 and is withdrawn from the output terminals 9. The purpose of employing such electromagnetic coupling or antenna coupling is to achieve loose coupling so as to attain as large a quality factor as possible inasmuch as the conventional circuit configuration has a small quality factor.

Although the above described circuit employs expansive fluoride resin for the circuit board in order to treat the high frequency signal efficiently, as a practical matter it is not possible to attain a sufficient quality factor and the stability of the oscillator is poor even with such a circuit board. Since the above described circuit employs a coaxial resonator having a stripline formed on a circuit board and cooperating with a metallic casing, the circuit becomes bulky. In addition, the dielectric constant of fluoride resin employed in the circuit board is not large and hence there is a limit to a degree of miniaturization attainable. Furtheremore, the linear expansion coefficient of the board is large and hence the dielectric constant of the board is changeable depending on a change in temperature, which gives rise to frequency fluctuation. Thus, a conventional circuit has a poor temperature stability of the frequency and hence generally requires an automatic frequency control. Therefore, a circuit configuration becomes complicated and bulky and at the same time expensive.

SUMMARY OF THE INVENTION

Accordingly, a principal object of the present invention is to provide an apparatus for detecting a variation of an electrostatic capacitance which apparatus is of a small size and inexpensive.

Another object of the present invention is to provide an apparatus for detecting a variation of an electrostatic capacitance suited for a signal reproducing circuit in a video disc apparatus of a CED type or a VHD type.

A further object of the present invention is to provide an improved cartridge for a video disc apparatus.

Still a further object of the present invention is to provide a cartridge for a video disc apparatus which makes it easy to exchange a signal reproducing circuit as well as a stylus.

An apparatus for detecting a variation of an electrostatic capacitance in accordance with the present invention employs a dielectric resonator for a resonator of oscillating means and for a resonator of a resonance circuit, wherein the oscillating means and the resonance circuit are capacitively coupled, and detecting means is directly coupled to the resonance circuit in a direct current manner. A coaxial dielectric resonator, a stripline resonator or the like may be employed as a dielectric resonator.

According to the present invention, employment of a dielectric resonator as a resonator can simplify the circuit configuration as compared with the prior art and can provide an apparatus for detecting the variation of an electrostatic capacitance, which apparatus is of a very small size and exhibits excellent performance characteristics. Experimentation has revealed that the volume of the circuit of the present invention can be reduced to less than one tenth of that the prior art. Furthermore, employment of a dielectric resonator makes it possible to provide a circuit of excellent stability in frequency with respect to temperature change and at the same time to provide good mechanical stability. A possible implementation in a small size is particularly preferred for a signal reproducing circuit of a video disc apparatus.

In one embodiment of the present invention in inductance is inserted between a resonance circuit and a detector, whereby a high frequency signal from the oscillator can be prevented from being directly applied to the detector and enhancement of the signal to noise ratio can be expected.

In another embodiment of the present invention, a cartridge of a video disc apparatus is adapted such that a signal reproducing circuit for converting a variation of an electrostatic capacitance transferred from a stylus is mounted to a casing of the cartridge, so that the stylus and the signal reproducing circuit can be simultaneously replaced by replacing the casing. According to the embodiment now in description, the signal reproducing circuit as well as the stylus can be exchanged with ease, whereby a cartridge of an enhanced performance can be provided with ease.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
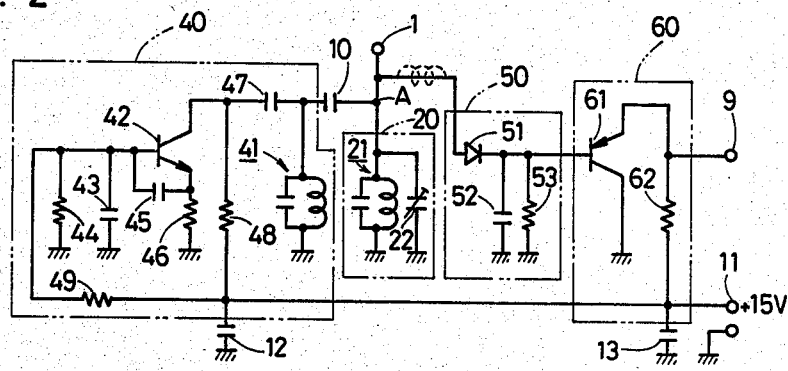
FIG. 2 is a schematic diagram of one embodiment of the present invention.

FIG. 2 is a schematic diagram of one embodiment of the present invention. Referring to FIG. 2, the circuit comprises an oscillator 40 whose output has a frequency of 915 MHz, a resonance circuit 20 having a resonance frequency which may be changed as a function of the variation of capacitance between a stylus and a disc of a video disc apparatus, a detector 50 for envelope detecting the oscillating signal which is amplitude modulated by the resonance circuit 20, and an amplifier 60 for amplifying the output of the detector 50. One of the features of the present embodiment of the invention resides in employment of a dielectric resonator 41 as the resonator of oscillator 40 and employment of a dielectric resonator 21 as the resonator of resonance circuit 20. Furthermore, the oscillator 40 and the resonance circuit 20 are capacitively coupled by means of a coupling capacitor 10, while the resonance circuit 20 and the detector 50 are directly coupled in terms of direct current. The circuits will now be described in greater detail with reference to FIG. 2.

The oscillator 40 comprises a Colpitts oscillator, for example, including a transistor 42. The base of the transistor 42 is coupled through a resistor 49 to a power supply terminal 11. High frequency signals at the base of transistor 42 are connected through a bypassing capacitor 43 to the ground. Other signals are connected through a resistor 44 to the ground. The base of the transistor 42 is also connected through a feedback capacitor 45 to the emitter thereof. The emitter of the transistor 42 is further connected through an emitter resistor 46 to ground. The collector of the transistor 42 is connected through a capacitor 47 to the dielectric resonator 41 and is also connected to a capacitor 10. The capacitor 47 serves to ensure stabilized oscillation by the oscillator 40 at the frequency of 915 MHz by pulling the frequency into the resonance frequency of the dielectric resonator 41. A resistor 48 is inserted between the collector of the transistor 42 and a power supply line extending from the power supply terminal 11.

Figure 1:
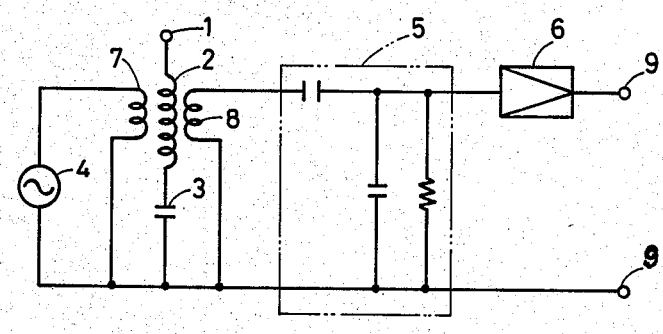
FIG. 1 is a schematic diagram of a conventional FM video signal reproducing circuit for use in a video disc apparatus of a CED type or a VHD type.

A terminal 1 coupled to a stylus (not shown) to detect a variation of capacitance between the stylus and the disc is coupled to the resonance circuit 20. It should be noted that the oscillator 40 and the resonance circuit 20 are capacitively coupled by means of the coupling capacitor 10. Accordingly, the oscillating output of the oscillator 40 is not drastically attenuated, as in the case of a conventional circuit as shown in FIG. 1 which employs loose coupling by means of electromagnetic coupling. As a result, the magnitude of the output of the oscillator 40 need not be as large as in the conventional circuit of FIG. 1. The resonance circuit 20 comprises a dielectric resonator 21 coupled to the terminal 1 and a trimmer capacitor 22 coupled in parallel with the dielectric resonator 21. The trimmer capacitor 22 is provided for fine adjustment of the resonance frequency of the resonance circuit 20. The electrostatic capacitance between the above described stylus and disc is coupled in parallel with the dielectric resonator 21 connected to the terminal 1 and thus the resonance circuit 20 is formed, in which the parallel resonance frequency is set to the frequency of say 910 MHz. As well known, the dielectric resonator can provide a very large quality factor. The unloaded quality factor of the resonance circuit 20 of the present embodiment of the invention is as large as approximately 500. According to such structure, a signal of 915 MHz is obtained at the point A as in the case of the conventional circuit, which signal is an amplitude modulated signal whose amplitude varies in accordance with an electrostatic capacitance between the stylus and the disc.

Terminal 1, (i.e. the point A of the resonance circuit 20) is further connected to the detector 50. It should be noted here that the resonance circuit 20 and the detector 50 are directly coupled to one another. Since such direct coupling structure causes degradation of the quality factor, such direct coupling structure could not be implemented in the FIG. 1 diagram. In contrast, since the dielectric resonator 21 of the present embodiment has a very high quality factor, such structure can be implemented. More specifically, the quality factor of the resonance circuit 20 is set by the directly coupled detector 50 to be in the range of 40 to 50 most suited to the circuit. The detector 50 comprises an envelope detecting circuit including a diode 51 having the anode connected to the output of the resonance circuit 20, a capacitor 52 inserted between the cathode of the diode 51 and the ground, and a resistor 53 inserted between the cathode of the diode 51 and the ground. The detecting circuit 50 provides a signal associated with variation of electrostatic capacitance between the stylus and disc, i.e. an FM video signal.

The amplifier 60 comprises a transistor 61 for receiving the output of the detector 50 at the base thereof. The emitter of the transistor 61 is connected to the output terminal 9 and is also connected through a resistor 62 to the power supply terminal 11. The collector of the transistor 61 is connected to the ground.

The power supply line extending from the power supply terminal 11 is connected through the bypassing capacitors 12 and 13 to ground. The paired capacitors 12 and 13 serve as capacitors for preventing high frequency components from entering onto the power supply line.

Figure 3:
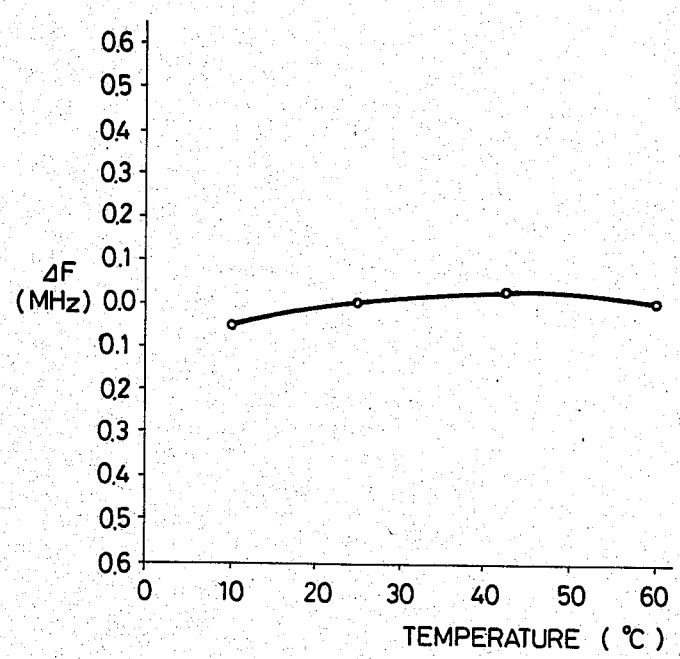
FIGS. 3 to 5 are graphs for explaining the effect of the FIG. 2 embodiment.
Figure 4:
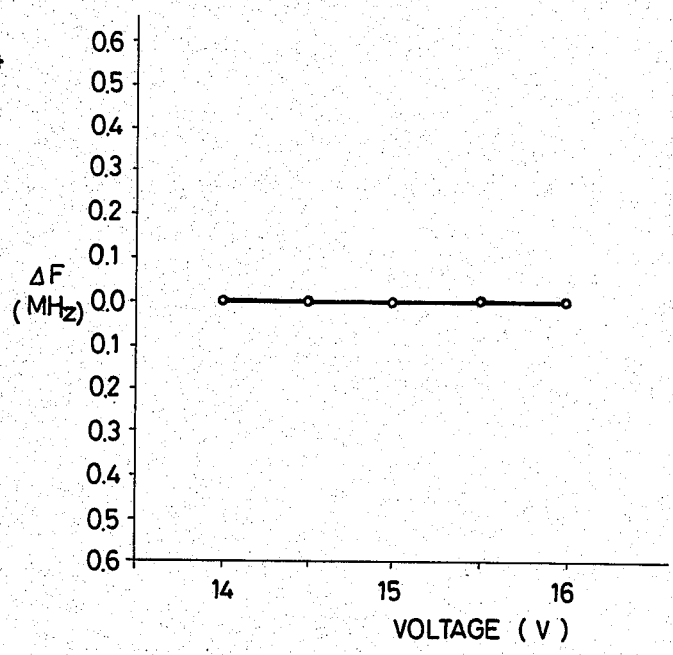
Figure 5:
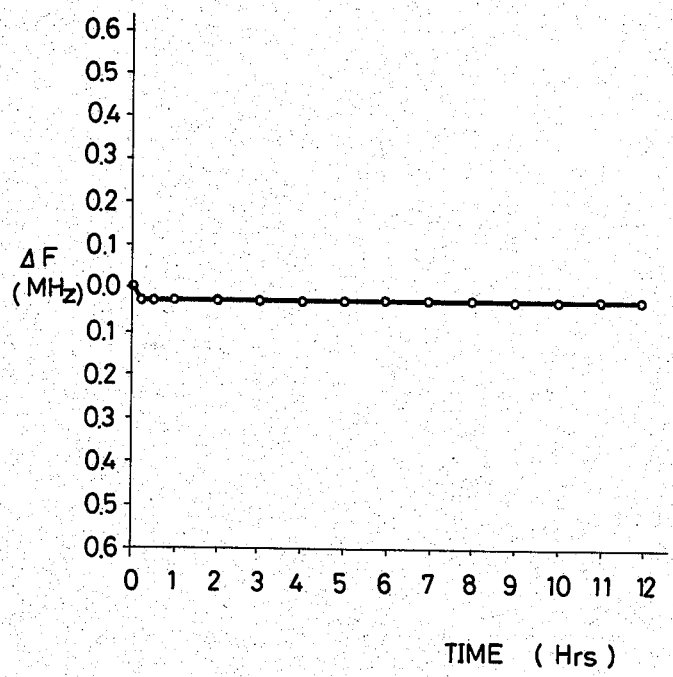

FIGS. 3 to 5 are graphs showing the results of experimentation obtained by measuring the frequency fluctuation under the various conditions using the embodiment of FIG. 2. FIG. 3 shows a frequency fluctuation with respect to a temperature change, FIG. 4 shows a frequency fluctuation with respect to a change of the power supply voltage, and FIG. 5 shows a frequency fluctuation with respect to the lapse of time. As is clear from FIGS. 3 to 5, the embodiment of FIG. 2 exhibits excellent stability in frequency wherein the frequency only fluctuates slightly under various conditions. The result of experimentation reveals that in the case where the oscillation frequency of the oscillator 40 is set to be 915 MHz and the resonance frequency of the resonance circuit 20 is set to be in the vicinity of 910 MHz the capacitance value of the coupling capacitor 10 is most preferably 0.1 to 0.5 pF in order that the oscillation output of the oscillator 40 may be +10 dBm (dBm is the intensity of the signal when 1 mW is 0 dB) and the output at the point A applied to the detector 50 may be approximately +6 dBm of the optimum signal level.

Preferably, by inserting an inductance element such as a coil between the resonance circuit 20 and the detector 50, it is possible to reduce a high frequency signal from the oscillator 40 directly entering into the detector 50. As a result, a signal to noise ratio of the circuit can be further enhanced.

As described in the foregoing, the embodiment of FIG. 2 employs dielectric resonators having an extremely large quality factor as the resonator component of the oscillator 40 and as the resonator component of the resonance circuit 20. As a result the circuit configuration can be simplified and can be implemented in a small size with excellent performance as compared to the conventional circuit. According to the above experiments, the volume of the present embodiment of the invention could be reduced to be smaller than one tenth of the conventional circuit. Furthermore, employment of a dielectric resonator makes it possible to implement a circuit having excellent frequency stability with respect to a change in temperature with high mechanical stability.

It is a matter of course that the present invention can also be employed in a measuring circuit for measuring a minor distance by picking up the same in terms of a change in capacitance, apart from a video disc apparatus of a CED type or a VHD type.

The dielectric resonator may be not only of a coaxial type, as described in conjunction with the preferred embodiment, but may also be formed a stripline resonator.

The dielectric resonator used in the resonance circuit 20 is preferably formed of a dielectric material having as small a dielectric constant as possible. In the case of a dielectric material having a small dielectric constant, the characteristic impedance is increased and, the larger the characteristic impedance, the larger the variation range of the resonance frequency with respect to the same capacitance variation and accordingly the larger the degree of amplitude modulation degree, with the result that a larger detected output can be obtained. However, since a small dielectric constant means that a large sized resonator must be provided, the dielectric constant should be determined considering both the size of a resonator and the characteristic impedance.

Figure 6:
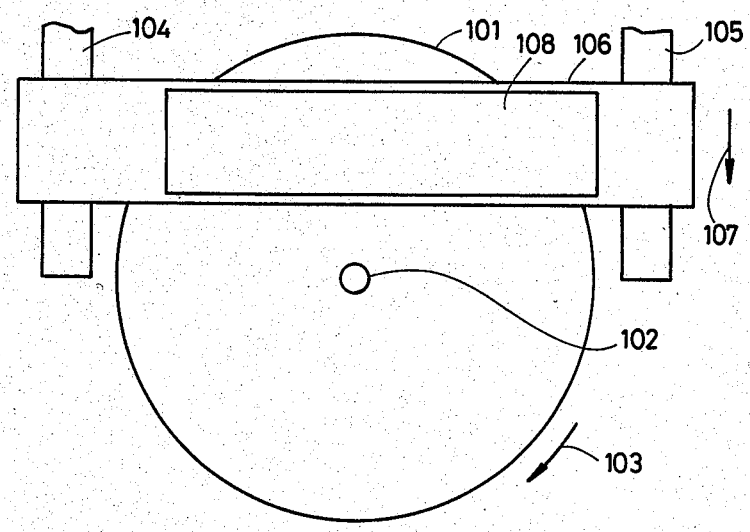
FIG. 6 is a plan view showing a cartridge associated portion of a video disc apparatus.

As shown in FIG. 6, a video disc 101 having an FM video signal recorded therein as a series of grooves is mounted to a video disc apparatus. The video disc 101 is rotated in the direction of arrow 103 by means of a rotational shaft 102. Arm guides 104 and 105 are disposed in parallel with a radial direction of a video disc 101 are provided in the vicinity of the periphery of the video disc 101. An arm 106 is provided on the arm guides 104 and 105 to be movable on the guides 104 and 105. The arm guides 104 and 105 or the arm 106 are provided with an arm driving mechanism, not shown, so that the arm 106 may be moved in the arrow 107 direction as reproduction proceeds.

The arm 106 is provided with a cartridge 108 for supporting a stylus, not shown. The cartridge 108 is detachably provided, so that it may be replaced. The cartridge 108 is also structured to house a signal reproducing circuit for reproducing an FM video signal. The signal reproducing circuit comprises an oscillator, a resonance circuit, a detector, an amplifier and the like, as described previously, and, when the cartridge 108 is mounted to the arm 106, the resonance circuit is electrically connected to the stylus of the cartridge 108. The signal reproducing circuit serves to convert a variation in an electrostatic capacitance between the stylus and the video disc 101 into an FM video signal by amplitude modulation.

Figure 7A:
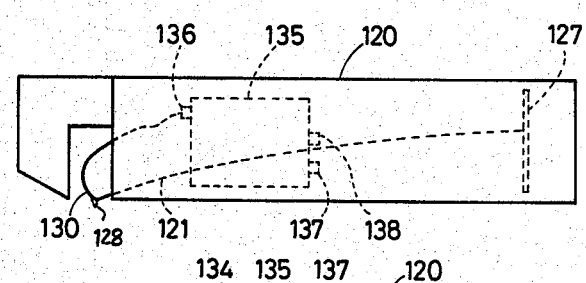
FIGS. 7A and 7B are views of a preferred embodiment of the cartridge.
Figure 7B:
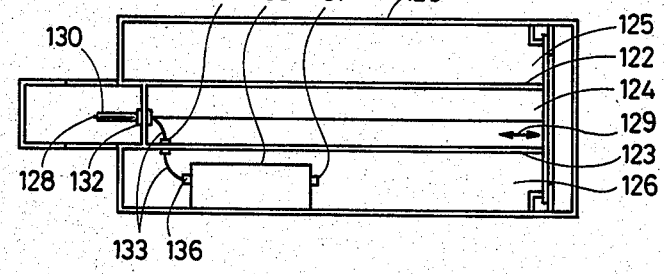

FIG. 7A is a side view of one embodiment of the present invention and FIG. 7B is a bottom view of the FIG. 7A embodiment. Referring to the figures, a casing 120 made of synthetic resin, for example, is sectioned to three chambers 124, 125 and 126 by partitions 122 and 123. A cantilever 121 is housed in the chamber 124. The cantilever 121 is made of a metallic wire, for example, one end of which is supported by a damper 127. The dumper 127 is formed with an elastic member and a metallic plate so that the cantilever 121, and thus the stylus 128, may be moved back and forth along the groove or pit of the video disc 101. The dumper 127 is driven in the direction of arrow 129 by the dumper driving mechanism, not shown, provided on the arm 106. A time base error occurring due to eccentricity, vertical vibration, deformation and the like of the video disc 101 is corrected by the above described driving mechanism.

A stylus 128 is formed on the other end of the cantilever 121. The stylus 128 comprises an electrode of a natural diamond, titanium or the like formed by sputtering. One end of a fly lead 130 is further provided conductively at the other end of the cantilever 121. The fly lead 130 is formed with a metallic wire having elasticity. The other end thereof is supported by a connector 132 fixed through a wall 131 forming one end surface of the chamber 124. More specifically, the fly lead 130 transmits a variation in electrostatic capacitance between the stylus 128 and the video disc 101 to a signal reproducing circuit 135 and also maintains a depressing force of the stylus 128 to the video disc 101 (the so-called stylus force) to a suitable value.

A lead wire 133 is connected to a connector 132 protruding on the side of the partition 124. The lead wire 133 is led to the partition 126 through the connector 134 provided through the partition 123. The signal reproducing circuit 135 is housed in the partition 126 and the lead wire 133 is connected to the input terminal 136 of the signal reproducing circuit 135. The signal reproducing circuit 135 has one end surface thereof fixed to the outer wall of the casing 120 by adhesion, for example. When exchanging the casing 120, not only the stylus 128 but also the signal reproducing circuit 135 is simulaneously exchanged. The signal reproducing circuit 135 comprises a power supply terminal 137 and an FM video signal output terminal 138. When the casing 120 is mounted onto the arm 106, the power supply terminal 137 is connected to the power supply output terminal, not shown, provided on the arm 106. As a result, a driving power supply is fed to the signal reproducing circuit 135. Likewise, when the casing 120 is mounted onto the arm 106, the FM video signal output terminal 138 is connected to the FM video signal input terminal, not shown, mounted on the arm 106. As a result, the FM video signal is amplified to a receiving circuit, not shown, whereby reproduction of a sound and picture is made.

Meanwhile, the arm 106 is provided with a swinging mechanism for swinging movement of the cantilever 121 in the radial direction of the video disc 101 for correctly tracking the stylus 128 to the groove or pit. Since the swinging mechanism is housed in the chambers 125 and 126 of the casing 120 when the casing 120 is mounted on the arm 106, the signal reproducing circuit 135 may be provided in the space other than the space where the swinging mechanism is housed.

Although the embodiment as shown in FIGS. 7A and 7B is adapted such that the signal reproducing circuit 135 is provided inside the casing 120, the signal reproducing circuit 135 may also be provided externally of the casing 120.

Although the signal reproducing circuit 135 is preferably such an improved circuit as shown in FIG. 2, as far as the embodiment shown in FIGS. 7A and 7B in concerned, such a conventional circuit as shown in FIG. 1 may also be used.

According to the embodiment shown in FIGS. 7A and 7B, the signal reproducing circuit is mounted onto the casing so that the stylus and the signal reproducing circuit may be simultaneously exchanged in exchanging the casing. Therefore, it is possible to exchange a signal reproducing circuit with ease and to make comparison of performance of the signal reproducing circuit with ease and enhances the performance thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for detecting a variation of an electrostatic capacitance, comprising:
    an oscillating circuit including a dielectric resonator for generating an oscillating output signal;
    a resonance circuit including a dielectric resonator and responsive to variations of said electrostatic capacitance to amplitude modulate said output signal so that its amplitude varies in accordance with said variation in said electrostatic capacitance;
    means for capacitively coupling said oscillating output signal to said resonance circuit; and
    detecting means, directly coupled in terms of direct current, to said resonance circuit and responsive to said amplitude modulated output signal for generating a second output signal whose frequency varies in accordance with said variation of said electrostatic capacitance.

2. An apparatus for detecting a variation of an electrostatic capacitance in accordance with claim 1, wherein
    said resonance circuit comprises means coupled to said dielectric resonator for fine adjusting the resonance frequency of said resonance circuit.

3. An apparatus for detecting a variation of an electrostatic capacitance in accordance with claim 1, which further comprises
    an inductance element interposed between said resonance circuit and said detecting means, said amplitude output signal being applied to said detecting means via said inductance element.

4. An apparatus for detecting a variation of an electrostatic capacitance in accordance with any one of the preceding claims 1 to 3, wherein:
    said apparatus is housed in a cartidge for detecting a variation in an electrostatic capacitance which results from a groove or pit formed on a disc of a CED type or a VHD type;
    said cartridge comprises a stylus facing said groove or pit of said disc, and a casing for holding said stylus; and
    said apparatus for detecting a variation of an electrostatic capacitance being mounted on said casing and converting a variation in an electrostatic capacitance transferred from said stylus into an electrical signal.

5. An apparatus for detecting a variation of an electrostatic capacitance in accordance with claim 4, wherein
    said apparatus for detecting a variation of an electrostatic capacitance is housed in said casing, whereby both said stylus and said apparatus for detecting a variation of an electrostatic capacitance can be replaced together by replacing said casing.

6. An apparatus for detecting a variation of an electrostatic capacitance in accordance with claim 4, wherein
    said apparatus for detecting a variation of an electrostatic capacitance is mounted onto the outside of said casing, whereby both said stylus and said apparatus for detecting a variation of an electrostatic capacitance can be replaced together by replacing said casing.

7. An apparatus for detecting a variation of an electrostatic capacitance in accordance with claim 1, further including:

a stylus for reading an information signal from a disc having grooves or pits formed therein; and a casing holding said stylus, said oscillating means, said resonance circuit, said capacitively coupling means and said detecting means whereby all of said elements can be replaced together by replacing said casing.

* * * * *